United States Patent [19]

Muranaka

[11] Patent Number: 5,591,784
[45] Date of Patent: Jan. 7, 1997

[54] CURING OF FIBER-REINFORCED COMPOSITE STRUCTURES

[75] Inventor: Koichi Muranaka, Sagamihara, Japan

[73] Assignee: Three Bond Co., Ltd., Tokyo, Japan

[21] Appl. No.: 491,274

[22] Filed: Jun. 16, 1995

[30] Foreign Application Priority Data

Jun. 17, 1994 [JP] Japan .................................. 6-168536

[51] Int. Cl.⁶ ...................................................... C08F 2/46
[52] U.S. Cl. ............................................. 522/74; 522/178
[58] Field of Search ................................ 522/74, 178

[56] References Cited

U.S. PATENT DOCUMENTS

| | | | |
|---|---|---|---|
| 3,789,055 | 1/1974 | Klebe et al. | 522/167 |
| 4,525,407 | 6/1985 | Ness | 428/138 |
| 4,546,145 | 10/1985 | Kishida et al. | 522/81 |
| 5,189,093 | 2/1993 | Beziers et al. | 524/847 |
| 5,283,026 | 2/1994 | Okumura et al. | 264/234 |
| 5,290,856 | 3/1994 | Okamoto et al. | 525/64 |

FOREIGN PATENT DOCUMENTS

| | | |
|---|---|---|
| 53-98290 | 8/1978 | Japan . |
| 58-101119 | 6/1983 | Japan . |
| 61-289163 | 12/1986 | Japan . |
| 62-121045 | 6/1987 | Japan . |
| 62-162538 | 7/1987 | Japan . |
| 63-186774 | 8/1988 | Japan . |
| 1-223953 | 9/1989 | Japan . |
| 2-085205 | 3/1990 | Japan . |
| 2-182438 | 7/1990 | Japan . |
| 3-111429 | 5/1991 | Japan . |
| 3-104621 | 5/1991 | Japan . |
| 3-158236 | 7/1991 | Japan . |
| 3-213543 | 9/1991 | Japan . |
| 4-093843 | 3/1992 | Japan . |
| 4-158025 | 6/1992 | Japan . |
| 5-330482 | 12/1993 | Japan . |
| 6-047808 | 2/1994 | Japan . |
| 6-031869 | 2/1994 | Japan . |
| 6-031833 | 2/1994 | Japan . |
| 62-33889 | 8/1994 | Japan . |
| 62-44259 | 9/1994 | Japan . |

*Primary Examiner*—Mark Chapman
*Attorney, Agent, or Firm*— Scully, Scott, Murphy & Presser

[57] ABSTRACT

Curing of a carbon fiber-reinforced composite structure is performed efficiently by a simple procedure wherein a composite material is formed with a carbon fiber, a photo-curable resin and a catalyst and the said composite material is cured with irradiation of a light so that even the resin existing in its interior is cured.

7 Claims, No Drawings

CURING OF FIBER-REINFORCED COMPOSITE STRUCTURES

BACKGROUND OF THE INVENTION

The present invention relates to a fiber-reinforced composite structure, and, more specifically, to a curing method for the same.

Carbon fiber-reinforced plastics are usually referred to as carbon fiber-reinforced composite materials or structures, which have been frequently applied in various industries including sport articles, aircraft industry, space industry, automobile industry and so on in view of their superior properties such as a higher strength, a higher elastic modulus, a light weight and the like. In the case where a curing resin is used as a matrix resin, there have been usually used such heat-curable resins as an epoxy resin, an unsaturated polyester resin, an acrylic resin, a phenol resin and the like. Accordingly, it is required for curing to heat at an elevated temperature over a prolonged period of time, for example, as taught in JP60-16899B, and there has been also required such a large-scale curing equipment as an oven and the like. Then, there have been suggested for a reduced curing period the heating by microwave, for example, as taught in JP2-182438A or JP3-182309A and the high frequency heating, for example, as taught in JP3-182310A. However, these heating procedures have also required a large-scale equipment. Also, there has been suggested the curing by the heat produced with electric charge to the carbon fiber in a sheet, for example, as disclosed in JP4-158025A and JP5-330482A. However, this process has been difficult to find and fix adequate conditions, as the carbon fiber could be burnt off when transmitted too much or a sufficient curing could not be achieved when transmitted at a low level. Moreover, there has been present the problem, when a sheet with a large area is to be cured, to supply an electric current at a large capacity, which also leads to a further need for the equipment therefor. Also, there has been suggested the process of filament winding wherein a mandrel is supplied therein with, e.g., quick lime and water and a resin is cured by the chemical reaction heat thus produced as disclosed in JP4-224929A; however, this process has the problems in that an applicable form is restricted and that temperature controlling is difficult in view of the chemical reaction heat to be utilized.

On the other hand, a photocurable resin has been known as a one pack type resin curable at room temperature in a short period of time. As the fiber for a fiber-reinforced plastic using this resin as a matrix resin, there has been mainly employed a glass fiber in view of its transmission to active light, transparency and others. For instance, JP53-98290A, JP58-101119A, JP62-44259A and others disclose the technique about the production of a fiber-reinforced plastic using a photocurable resin, wherein a glass fiber solely is employed as a reinforcing fiber. A similar technique is also disclosed in JP1-223953A, JP2-85205A, JP3-104621A, JP3-111429A and others, which state that such opaque reinforcing fiber as carbon fiber would not be preferable when a photocurable resin is used as a matrix resin and could be applied as far as it does not inhibit light transmission. JP63-186774A discloses a carbon fiber, in addition to a glass fiber, as an applicable reinforcing fiber. However, when a carbon fiber is used as a reinforcing fiber according to this procedure, the cure could be achieved only at the surface of the composite structure and the interior of the composite structure remains uncured. On the other hand, it is suggested as the technique for using a carbon fiber as a reinforcing fiber that an ultraviolet-curable resin having incorporated therein a curing catalyst, e.g., a peroxide and the like is employed and cured only at the surface by ultraviolet irradiation while the interior is cured separately by heat. Such a technique involves individually the step for surface cure and that for interior cure, which results in a reduction on the merit using the photocurable resin capable of being cured in a short period of time. Apart from the above-mentioned techniques, JP4-93843A discloses the technique for a heat-photocurable composition and formation of polymerized image using the same, which is directed to the technique wherein a radical-polymerizable resin composition having incorporated therein a radical-polymerization initiator and a thermally-decomposing curing promoter is irradiated with heat-emitting active radiation and active radiation capable of activating active components solely to form polymerized image. However, it does not disclose any production of a carbon fiber-reinforced plastic, and further it requires irradiation with two types of active radiations together with the thermally-decomposing curing catalyst to be added, which results in complicated procedures.

It is the object of the present invention to provide a carbon fiber composite structure, particularly a prepreg of the carbon fiber fabric such as a woven or nitted fabric impregnated with a resin, without the problems as described above.

SUMMARY OF THE INVENTION

The present invention relates to a curing method of a composite structure which comprises forming a composite structure which comprises forming a composite structure composed mainly of a carbon fiber and a curing resin and irradiating the said composite structure with light to cure the whole resin up to the interior of the said composite structure.

DETAILED DESCRIPTION OF THE INVENTION

The curing resin which may be employed on the present invention may be the radical-polymerizing or cation-polymerizing resin components or those components having both polymerizing properties (usually monomers and/or oligomers) already known in the art, which may form crosslinking with light irradiation to provide cured resins.

As the catalyst, there may be used those catalysts to be activated with irradiation of a visible light and/or an infrared light or those to be activated with heat and one may particularly preferably employ both the catalyst to be activated with irradiation of a visible light and/or an infrared light and the catalyst to be activated with heat.

The carbon fiber as used herein is meant to be the fiber which may be obtained by oxidizing an organic fiber such as polyacrylonitrile (PAN), rayon, pitch and the like with air or the like and then carbonizing the fiber under an inert atmosphere usually at 900°–1500° C. to accomplish graphitization or by graphilizing the said fiber at a far elevated temperature, for example, 2000°–3000° C. These carbon fibers may take the form of a roving, a mat, a cloth, a chopped strand and the like and there may be employed any type thereof. And, there may be employed any combination thereof with other fibers such as a glass fiber and the like.

As the combination of the curing resin with the catalyst, there may be generally mentioned a combination of a polymerization catalyst capable of producing a free radical with light irradiation with an addition-polymerizing compound having ethylenic unsaturations (a monomer or an oligomer), a combination of a catalyst capable of producing a cation with light irradiation with a compound having glycidyl groups (a monomer or an oligomer) and the like.

As the catalyst to be activated by irradiation with visible light, there are well-known, for example, the following ones. There may be mentioned a complex initiator system of a dye and an aliphatic amine (JP44-20189B), a system of a hexa-aryl biimidazole, a radical-producing agent and a dye (JP45-37377B), a system of a hexa-aryl biimidazole and a ρ-dialkylaminobenzylidene ketone (JP47-2528A), a system of a cyclic cis-α-dicarbonyl compound and a dye (JP48-84183A), a system of a carbonyl compound and a tertiary amine (JP52-134692A), a system using a (keto)coumarine (JP52-112681A), a system of a substituted triazine and a metallocyanine pigment (JP54-151024A), a system of a biimidazole and an indanone (JP54-155292A), a system of a hexa-aryl biimidazole and a ρ-dialkylaminostilbene derivative (JP57-21401A), a system of a hexa-aryl biimidazole and a ρ-dialkylaminocinnamylidene derivative (JP58-19315A), a system of a trizine derivative and a cyanine dye (JP58-29803A), a system of a triazine derivative and a thiapyrilium salt (JP58-40302A), a system of a hexaarylbiimidazole and a n-dialkylstilbene derivative or of a ρ-dialkylaminophenylbutadienyl derivative and a thiol compound (JP59-56403A), a system of a ketone-substituted derivative and an organic peroxide (JP60-32801A), a system of a coumarine pigment and a diaryl iodonium salt (JP60-88005A), a system of an α-diketone and a mercaptocarboxylic acid (JP61-258802A), a system of a xanthene pigment and a photo-polymerization promotor (JP60-221403A), a system of an α-diketone and a polysulfide (JP61-258803A), a system of a xanthene pigment, a radical generator, and a peroxide (JP62-143043A), a system using a dye-borate complex (JP62-143044A), a system of a coumarine pigment and an organic peroxide (JP63-23901A), a system using titanocene (JP63-41484A), a system using a metal-allene complex (JP2-296802A), a system of a titanium compound and a substituted coumarine compound (JP3-239703A), a system using a 3-keto-coumarine compound (JP4-145102A), a system of an onium compound and an acridine derivative (JP4-170546A), a system of a metal-allene compound and a squalilium pigment and a N,N-dialkylaniline (JP5-311093A), a system of a naphthocyanine compound and a S-triazine compound (JP5-301910A), and the like.

As the catalyst to be activated by heat, there may be mentioned an azo compound, an organic peroxide and the like. As the azo compound as used herein, there may be a compound having the general formula

(wherein $R_1$ and $R_2$ may be the same or different and each represents a substituted or unsubstituted alkyl or alkenyl group). There may be illustratively mentioned 2,2'-azoisobutyronitrile, 4,4'-azobis(4-cyanovaleric acid), 2,2'-azobis(2,4-dimethylvaleronitrile), 2,2'-azobis(4-methoxy-2,4-dimethylvaleronitrile), 1,1'-azobis(cyclohexane-1-carbonitrile), 2,2'-azobis isobutyric acid dimethyl ester, 2,2'-azobis(2-methylpropionic acid), 2,2'-azobis(2-cyclobutylpropionic acid), 2,2'-azobis (2-cyclobutylpropionic acid), 2,2'-azobis[2-(3-hydroxyphenyl)butyric acid], 2,2'-azobis(4-nitrovaleric acid), 2,2'-azobis(4-chlorovaleric acid) and the like.

As the representative example of the organic peroxide, there may be mentioned diacylperoxides, dialkylperoxides, ketone peroxides, peroxyesters and the like. Those peroxides having a too lower decomposition temperature are not preferable and one may use particularly useful organic peroxides having a temperature of not lower than 50° C., preferably 70°–110° C., to reach the half-life period of 10 hours. Those peroxides having a higher decomposition temperature may be also applicable with simultaneous use of a promotor. There may be illustratively mentioned t-butylperoxy(2-ethyl-hexanoate), m-toluoylperoxide, benzoylperoxide, t-butylperoxy isobutyrate, cyclohexanoate peroxide, t-butylperoxide isobutyl-isopropylcarbonate, t-butylperoxyacetate, t-butylperoxybenzoate, dibutylperoxyisophthalate, dicumyl peroxide and the like; however, where a tertiary amine may be present in the resin components, the diaryl peroxide is not preferable owing to a possible poor storability.

As the catalyst to be activated with irradiation of visible light and/or infrared ray, there may be mentioned a system of a metal-allene compound and a cyanine compound (JP4-102855A), a system of a metal-allene compound, a squalilium compound and a N,N-dialkylaniline (JPS-311093A), a system of a naphthalocyanine compound, a N-aryl-α-amino acid or an organic peroxide (JP5-301910A) and the like.

As the addition-polymerizable ethylenically unsaturated compound as one example of the resin components of photocurable resins, there may be mentioned the following resins (usually monomers or oligomers thereof):

1) The compound having one or more (meth)acryloyl groups within its molecule; more illustratively, one or more of (a) the resin having one or more (meth)acryloyl groups within its molecule (For example, there may be mentioned urethane diacrylate, epoxydiacrylate, polyester diacrylate and the like, which may be easily available.), (b) the monomer having one or more (meth)acryloyl groups within its molecule (For example, there may be mentioned 2-hydroxy-ethyl acrylate, diethylene glycol acrylate, phenoxyethyl acrylate and the like, which may be easily available.) and the like.

2) The resin having as one essential component an unsaturated acid such as maleic anhydride or fumaric anhydride and the like and having dissolved in a polymeric monomer such as a styrene monomer and the like the resin obtainable by esterification of the former resin and a saturated polybasic acid such as phthalic anhydride, isophthalic anhydride and the like simultaneously used with a polyhydric alcohol such as propylene glycol, ethylene glycol and the like, which may be easily available as FRP resins.

Also, it is preferable to incorporate various fillers into the ethylenically unsaturated resins in order to improve the property or physical property thereof. As the preferable fillers, there may be mentioned, for example, inorganic fillers such as silica, alumina, quartz, glass, calcium carbonate and the like and organic fillers such as polyethylene powder, various rubber particles and the like. Moreover, it may be possible to incorporate further a variety of additives such as a polymerization inhibitor, an adhesive improver, an antioxidant and the like.

In the present invention, the carbon fibers having a sheet form, usually woven fabric, knitted fabric and the like can be impregnated with a mixture of the catalyst and the curing resin to form a composite structure as moldings and then light can be irradiated onto the structure from at least one direction. Illustratively speaking, where the resin is solid or of a high viscosity, the resin and the catalyst may be dissolved in an organic solvent such as acetone, methylethyl ketone or toluene and a cloth composed of carbon fibers is impregnated with the resultant solution, after which the organic solvent is evaporated off by hot blast or in vacuo.

Alternatively, a mixture of the resin and the catalyst dissolved in an organic solvent can be coated over a release paper and a resin layer is formed by removing the organic solvent with hot blast or in vacuo. The resin layer is laminated or pressed onto single long strands composed of carbon fibers at their both sides, during which one should pay attention to drying conditions and the sort of the organic solvent and organic peroxide to be used so that the organic peroxide may be allowed to react with heat, when the organic solvent is evaporated off by hot blast. Where the resin has a low viscosity, a cloth composed of carbon fibers or unidirectional long strands may be impregnated directly with the said resin, in which the procedure (hand lay-up method) may be also applicable to place the cloth or unidirectional long strands onto the side of the composite material to be used and to have impregnated the material by direct coating of the resin thereover.

In preparing the composite structure by impregnating continuous carbon fibers with the matrix resin according to prepreg or hand lay-up process, the carbon fiber may have a volume content of 10–70%, more preferably 15–60%. If the carbon fiber may have a volume content of less than 10%, a volume of the carbon fiber as the reinforced material becomes insufficient, which leads to lowered tensile strength and elastic modulus, whereas, when a volume content of the carbon fiber is more than 70%, a carbon fiber volume becomes too large so that the matrix resin could not be compatible with the carbon fiber and hollows may be also formed, which leads to a lowered strength. And further, where such a compound as a sheet molding compound is prepared by incorporating carbon fiber-chopped strands into the resin, it is preferable on the same ground that the carbon fiber may be incorporated at 5–15 parts by weight per part of the resin.

In one aspect of the present invention, the resin-impregnated carbon fiber structure thus formed is irradiated with light.

As the light to be irradiated, one may use the light having a wave length of 400 nm or longer, more preferably the light containing a wavelength of 600–1000 nm. As the source for such a light having the above wave length, one may use a xenon lamp irradiating the light of a wave length of 300 nm or longer, particularly such an intense lamp having a wave length of 800–1100 nm, a metallic halide lamp radiating the light of a wave length of 300–1100 nm and having a wide visible light range and an intense strength of a wave length of 850–950 nm, a halogen lamp radiating the light of a wave length of 500–2500 nm and having an intense strength at a wave length in the vicinity of 1000 nm and the like. And, one may also use sunlight. If these light sources, one may particularly preferably use a halogen lamp as the light source which may efficiently radiate the light of a wave length of 800–1100 nm inexpensively and conveniently.

In the present invention, a noticeable effect can be achieved where the catalyst to be activated by irradiation with visible light and/or infrared ray or the catalyst to be activated with heat, especially a combination of both catalysts, is applied as the catalyst to be present in the curing resin as discussed hereinabove, which can be presumed that, when the present composite material is irradiated with light, the curing resin at the surface thereof may be first allowed to react and cure, the reaction heat at the surface and the exothermic heat with the carbon-fiber by absorption of light may also heat the resin impregnated within the carbon fiber and the catalyst present within the interior may be correspondingly activated to promote the curing of the resin present within the interior.

The present invention will be more fully illustrated by way of the following non-limiting Examples and Comparative Examples.

[EXAMPLE]

A carbon fiber cloth or an aramid fiber cloth was impregnated with the resin as described in the following Table according to a hand lay-up method to form ten sheets each of the clothes and six sheets were laminated to make a total thickness of 1.5 mm. The laminate was covered with a polyethylene film over its surface and back sides, and irradiated with a lamp from the height of 20 cm to determine the time required for curing the whole thickness of 1.5 mm.

BPE-4: Epoxyacrylate available from Shin-Nakamura Kagaku K.K.

Carbon fiber cloth: Torayca T-300 available from Toray Industries, Inc., made by plaining the bundled yarns composed of 1000 filaments of the fibers, each having a tensile strength of 3530 MPa [360 kgf/mm$^2$], a tensile modulus [24000 kgf/mm$^2$] with a density of 22.5 yarns/25 mm, having a thickness of 1.5 mm and a joint of 119 g/m$^2$.

Aramid fiber cloth: Quebra available from E. I. Dupont, made by plaining the yarns, each having a tensile strength of 2800 MPa [290 kgf/mm$^2$], a tensile modulus of 109000 MPa [11100 kgf/mm$^2$] and a denier of 1420 at 13×13 yarns/inch, having a thickness of 0.25 mm and a joint of 168 g/m$^2$.

Halogen lamp: Halogen lamp 300W available from Ushio Denki K.K.

Ultraviolet lamp: High-pressure mercury lamp 500W available from Ohku Seisakusho.

As apparent from the results of Table, where one used the aramid fiber having similar reinforcing properties to those of the carbon fiber, no curing was performed or, even if done, no inner curing was performed, whereas in the case of the carbon fiber inner curing was also unexpectedly performed.

However, where the light was an ultraviolet ray, there was obtained on inferior effect. And, where a near infrared light was irradiated, the activated catalyst and, where visible light and/or infrared light was irradiated, a combination of the activated catalyst with the catalyst to be activated by heat could exert a particularly noticeable effect.

TABLE 1

|  | Example 1 | Example 2 | Example 3 | Example 4 | Example 5 | Example 6 |
| --- | --- | --- | --- | --- | --- | --- |
| BPE-4 (Acrylmonomer) | 100 | 100 | 100 | 100 | 100 | 100 |
| Azobisisobutyronitrile (Heat-curing catalyst) | 1 |  | 1 |  | 1 |  |
| Benzoyl peroxide (Heat-curing catalyst) |  | 1 |  | 1 |  |  |

TABLE 1-continued

|  | Example 1 | Example 2 | Example 3 | Example 4 | Example 5 | Example 6 |
|---|---|---|---|---|---|---|
| Camphor-quinone (Visible light-curing catalyst) |  |  | 1 | 1 |  |  |
| k-naphthalocyanine |  |  |  |  | 0.5 | 0.5 |
| N-phenylglycine (Infrared ray-curing catalyst) |  |  |  |  | 0.25 | 0.25 |
| Reinforcing fiber | carbon fiber cloth | carbon fiber cloth | carbon fiber cloth | carbon fiber cloth | carbon fiber cloth | carbon fiber cloth |
| Irradiation lamp | Halogen lamp | Halogen lamp | Halogen lamp | Halogen lamp | Halogen lamp | Halogen lamp |
| Cure time (min.) | 7 | 7 | 5 | 5 | 4 | 8 |

TABLE 2

|  | Comparative Example 1 | Comparative Example 2 | Comparative Example 3 | Comparative Example 4 | Comparative Example 5 | Example 7 | Example 8 |
|---|---|---|---|---|---|---|---|
| BPE-4 (Acrylmonomer) | 100 | 100 | 100 | 100 | 100 | 100 | 100 |
| Azobisisobutyronitrile (Heat-curing catalyst) | 1 |  | 1 |  |  | 1 |  |
| Benzoyl peroside (Heat-curing catalyst) |  | 1 |  | 1 |  |  | 1 |
| Camphor-quinone (Visible light-curing catalyst) |  |  | 1 | 1 | 1 |  |  |
| 1-Hydroxycyclohexyl-phenyl ketone (Ultraviolet-curing catalyst) |  |  |  |  |  | 1 | 1 |
| Reinforcing fiber | Aramid fiber cloth | Aramid fiber cloth | Aramid fiber cloth | Aramid fiber cloth | Carbon fiber cloth | Carbon fiber cloth | Carbon fiber cloth |
| Irradiation lamp | Halogen lamp | Halogen lamp | Halogen lamp | Hologen lamp | Halogen lamp | Ultraviolet lamp | Ultraviolet lamp |
| Cure time (min.) | Not cured | Not cured | Cured only at the surface | Cured only at the surface | Cured only at the surface | 12 | 12 |

TABLE 3

|  | Comparative Example 6 | Comparative Example 7 | Comparative Example 8 | Comparative Example 9 |
|---|---|---|---|---|
| BPE-4 | 100 | 100 | 100 | 100 |
| Azobisisobutyronitrile | 1 |  | 1 |  |
| Benzoyl peroxide |  | 1 |  | 1 |
| ② |  |  |  |  |
| ③ |  |  |  |  |
| ④ |  |  |  |  |
| Reinforcing fiber | Carbon fiber cloth | Carbon fiber cloth | Carbon fiber cloth | Carbon fiber cloth |
| Heating means | Far infrared heater | Far infrared heater | 150° C. Heating furnace | 150° C. Heating furnace |
| Cure time (min.) | 15 | 15 | 30< | 30< |

Far infrared heater: One infrastein Heater (AL) 800W available from NGK Industry Ltd.

Instead of the light irradiation, when cured with a far infrared heater and a heating furnace at 150° C., a longer time to be cured was required than the time by the lamp.

What is claimed is:

1. A process for curing a composite structure comprising:
   preparing a composite structure which includes carbon fiber, a curable resin having at least one (meth) acryloyl group in its molecule and a catalyst capable of being activated by heat; and
   irradiating said composite structure with visible light having a wavelength of at least 400 nm and/or infrared light.

2. A process in accordance with claim 1 wherein said light used in irradiating said composite structure is provided by a light emitting source selected from the group consisting of a xenon lamp, a metallic halide lamp and a halogen lamp.

3. A process in accordance with claim 1 wherein said catalyst is selected from the group consisting of azo compounds and organic peroxides.

4. A process for curing a composite structure comprising:
   preparing a composite structure which includes carbon fiber, a curable resin having at least one (meth) acryloyl group in its molecule, a first catalyst capable of being activated by heat and a second catalyst capable of being activated by irradiation; and irradiating said composite structure with visible light having a wavelength of at least 400 nm and/or infrared light.

5. A process in accordance with claim 4 wherein said step of irradiating said composite structure is provided by a light emitting source selected from the group consisting of a xenon lamp, a metallic halide lamp and a halogen lamp.

6. A process in accordance with claim 4 wherein said first catalyst is selected from the group consisting azo compounds and organic peroxides.

7. A photocurable fiber-reinforced composite structure comprising carbon fiber, a curable resin having at least one (meth) acryloyl group in its molecule, a first catalyst capable of being activated by heat and a second catalyst capable of being activated by irradiation with visible light and/or infrared light.

* * * * *